(12) United States Patent
Rath et al.

(10) Patent No.: US 6,355,603 B1
(45) Date of Patent: Mar. 12, 2002

(54) THERMAL CONVERSION PRODUCTS COMPRISED OF MALEIC ANHYDRIDE AND OLIGOALKENES, DERIVATIVES OF THE THERMAL CONVERSION PRODUCTS WITH AMINES OR ALCOHOLS AND THE USE THEREOF

(75) Inventors: Hans Peter Rath, Grünstadt; Helmut Mach, Heidelberg, both of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/623,174
(22) PCT Filed: Feb. 26, 1999
(86) PCT No.: PCT/EP99/01253
  § 371 Date: Aug. 29, 2000
  § 102(e) Date: Aug. 29, 2000
(87) PCT Pub. No.: WO99/46354
  PCT Pub. Date: Sep. 16, 1999

(30) Foreign Application Priority Data

Mar. 11, 1998 (DE) .......................................... 198 10 404

(51) Int. Cl.[7] .................... C10M 133/56; C10M 129/72
(52) U.S. Cl. ...................... 508/232; 585/287; 585/291; 585/452; 585/543; 585/575
(58) Field of Search .......................... 508/232; 505/291, 505/239, 452, 543, 575

(56) References Cited

U.S. PATENT DOCUMENTS

| | | | |
|---|---|---|---|
| 5,384,055 A | | 1/1995 | Ashjian |
| 5,859,159 A | * | 1/1999 | Rossi et al. .................. 526/176 |
| 6,043,401 A | * | 3/2000 | Bagheri et al. ................ 585/12 |
| 6,127,322 A | * | 10/2000 | Scott et al. .................. 508/232 |
| 6,184,429 B1 | * | 2/2001 | Sarin et al. .................. 585/524 |

FOREIGN PATENT DOCUMENTS

| | | |
|---|---|---|
| EP | 613873 A2 * | 9/1993 |
| GB | 1439567 | 6/1976 |
| WO | 93/24539 | 12/1993 |

* cited by examiner

Primary Examiner—Jacqueline V. Howard
(74) Attorney, Agent, or Firm—Keil & Weinkauf

(57) ABSTRACT

Thermal reaction products of maleic anhydride and oligoalkenes are obtainable by oligomerization of linear $C_8$- to $C_{12}$-1-alkenes, preferably in the presence of a titanium, zirconium or hafnium metallocene catalyst and of an activator based on organoaluminum, organoboron or carbocationic compounds and have a vinylidene double bond content of more than 30% and have a number average molecular weight from 1000 to 20,000.

Derivatives thereof with amines or alcohols are used as fuel additives and lubricant additives.

8 Claims, No Drawings

THERMAL CONVERSION PRODUCTS COMPRISED OF MALEIC ANHYDRIDE AND OLIGOALKENES, DERIVATIVES OF THE THERMAL CONVERSION PRODUCTS WITH AMINES OR ALCOHOLS AND THE USE THEREOF

This application is a 377 of PCT/EP99/01253 Feb. 26, 1999.

Thermal reaction products of maleic anhydride and oligoalkenes, derivatives of the thermal reaction products with amines or alcohols and use of these derivatives as fuel additives and lubricant additives The present invention relates to thermal reaction products of maleic anhydride and oligoalkenes obtained from specific linear α-olefins, which have a number average molecular weight of from 700 to 20,000, and a process for the preparation of these thermal reaction products. The present invention furthermore relates to derivatives of the thermal reaction products with amines or alcohols in the form of the corresponding alkenylsuccinamides, alkenylsuccinimides or alkenylsuccinic esters and the use of these derivatives as fuel additives and lubricant additives. The present invention also relates to motor oils which contain these derivatives as additives.

Imides of polyisobutenylsuccinic acids have long been known as ashless dispersants in the form of alkenylsuccinic acid derivatives. However, the polyisobutenyl radical and also other corresponding long-chain radicals known from the prior art do not yet ensure an optimum property spectrum of such dispersants. In particular, viscosity behavior is still unsatisfactory, i.e. a reduction in the low-temperature viscosity is desired.

WO-A 93/24539 (1) discloses poly-1-olefins obtained from $C_3$- to $C_{20}$-1-olefins, such as propene, 1-butene, 1-pentene or 1-hexene, having a number average molecular weight of from 300 to 10,000, which are prepared by conventional metallocene catalysis. Said 1-olefins are always used as a mixture with more readily volatile saturated and unsaturated hydrocarbons; for example, an industrial butane/butene stream or industrial isobutene-containing butene stream ("refined product I/II" from the steam cracker) is used. The poly-1-olefins obtained can then be converted by means of maleic anhydride into functionalized products which are used, inter alia, for lubricating oils and as fuel additives.

WO-A 96/28486 (2) relates to copolymers of unsaturated carboxylic acids or their anhydrides and oligomers of 1-olefins of 3 to 14 carbon atoms, which can be prepared by metallocene catalysis. Inter alia, n-decene is also mentioned here as a 1-olefin. The average molecular weight of the olefin oligomers is from 300 to 10,000. The copolymers obtained from the unsaturated dicarboxylic acids (anhydrides) and the olefin oligomers are suitable, after derivatization with amines, as fuel additives and lubricant additives.

WO-A 96/23751 (3) discloses olefin oligomers which are prepared by means of metallocene catalyst systems and are based on linear and cyclic $C_2$- to $C_{12}$-olefins, e.g. 1-decene. Their weight average molecular weight ($\overline{M}_w$) is from 100 to 20,000, with a molecular weight distribution $\overline{M}_w/\overline{M}_n$ (weight average value/number average value) of from 1.0 to 2.4. Their degree of polymerization is from 2 to 200. These olefin oligomers can be further processed according to (3) by the conventional chemical reactions, such as hydroformylation and/or hydroamination, to give functionalized compounds which are suitable, for example, as fuel additives or lubricant additives.

It is an object of the present invention to remedy the deficiencies of the prior art.

We have found that this object is achieved by thermal reaction products of maleic anhydride and oligoalkenes which are obtainable by oligomerization of linear $C_8$- to $C_{12}$-1-alkenes, have a vinylidene double bond content of more than 30%, in particular more than 50%, especially more than 60%, and have a number average molecular weight of from 700 to 20,000.

Suitable linear $C_8$- to $C_{12}$-1-alkenes and mixtures thereof are 1-octene, 1-nonene, 1-decene, 1-undecene and 1-dodecene and mixtures thereof. In a preferred embodiment, oligoalkenes which are obtainable by metallocene-catalyzed oligomerization of linear 1-decene are used, it being possible for up to 40 mol %, based on the amount of linear 1-decene, of further linear $C_8$- to $C_{12}$-1-alkene to be incorporated as polymerized units.

The essential monomer component in this preferred embodiment is thus linear 1-decene, which may be oligomerized alone or as a mixture with up to 40, in particular up to 20, especially up to 5, mol %, based on the amount of 1-decene, of further linear $C_8$- to $C_{12}$-1-alkenes (1-octene, 1-nonene, 1-undecene and/or 1-dodecene).

Said 1-alkene can be used in chemically pure form (purities of, usually, from 99 to 99.9% by weight) or as industrial mixtures in purities of, usually, from 90 to 99% by weight, the remaining components in the industrial mixtures usually being roughly equally volatile, polymerizable or unpolymerizable components (for example unsaturated isomers, homologs or saturated hydrocarbons). As a rule, the 1-alkenes used are virtually free of more highly volatile components, especially free of more highly volatile saturated or unsaturated hydrocarbons, in particular those having less than 8 carbon atoms; virtually free means that at most less than 1, in particular less than 0.5, % by weight of such more highly volatile components may occur.

In the oligomerization of said linear $C_8$- to $C_{12}$-1-alkenes, the procedure is carried out in particular under metallocene catalyst, especially in the presence of a titanium, zirconium or hafnium metallocene catalyst and of an activator based on organoaluminum, organoboron or carbocationic compounds.

The systems used for the oligomerization and comprising metallocene catalyst and activator are conventional catalyst systems. By varying the structure of the metallocene, it is possible to adjust the desired molecular weight ranges of the oligoalkenes in a known manner. The oligomerization is carried out as a rule in a suitable medium (reaction mixture), for example an organic solvent, under the conditions usual for this purpose.

The catalyst systems do not have to meet any special requirement, apart from being substantially soluble in the reaction mixture. The reaction mixture is the mixture which is present in the time after the combination of all reaction components up to, at the latest, the destruction of the catalyst system after the end of the oligomerization reaction. The solubility of the catalyst system in the reaction mixture is determined by measuring the turbidity of the reaction mixture analogously to DIN 38404. Substantial solubility of the catalyst system is present if the turbidity number is from 1 to 10, preferably from 1 to 3.

The metallocene component of the catalyst system is a complex of titanium, of zirconium or of hafnium, in which the metal atom M is bonded, in the form of a sandwich, between two unsubstituted or substituted cyclopentadienyl groups, the remaining valences of the central atom M being saturated by readily exchangeable leaving atoms or leaving groups $X^1$, $X^2$.

Suitable metallocene complexes are those of the formula $Cp_2MX^1X^2$, where M is titanium, zirconium or hafnium, preferably zirconium.

$CP_2$ is a pair of unsubstituted or substituted cyclopentadienyl ligands. Here, both cyclopentadienyl ligands or only one of the two may be substituted.

Where the substituents are $C_5$- to $C_{30}$-alkyl, the cyclopentadienyl rings are usually symmetrically substituted. This means that the type and number as well as the position of the alkyl substituents of one Cp ring are identical to the type, number and position of the alkyl substituents of the second Cp ring. The number of alkyl groups of the cyclopentadienyl ring is from 1 to 4.

Suitable $C_5$- to $C_{30}$-alkyl radicals are the aliphatic radicals pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl and their isomers, for example neopentyl and isooctyl, and the cycloaliphatic radicals cyclopentyl and cyclohexyl. n-Octadecyl is particularly suitable.

The unsubstituted or $C_5$- to $C_{30}$-alkyl-substituted cyclopentadienyl units may however also be substituted by 1 or 2 $C_4$- to $C_{10}$-alkyl units each which, together with the cyclopentadienyl unit, form a fused ring system, such as the tetrahydroindenyl system.

However, other suitable substituted cyclopentadienyl ligands are those pairs in which at least one cyclopentadienyl unit is substituted by at least one organosilyl group —$Si(R^1)_3$. $R^1$ is then an organic group of 1 to 30 carbon atoms, such as methyl, ethyl, n-propyl, isopropyl, n-butyl, isobutyl, sec-butyl, tert-butyl, n-pentyl, isopentyl, neopentyl, hexyl, heptyl, octyl, nonyl, cyclohexyl, phenyl or p-tolyl. Preferred organosilyl radicals are trimethylsilyl and tert-butyldimethylsilyl, in particular trimethylsilyl.

In the case of organosilyl substitution on the cyclopentadienyl units the symmetrical substitution pattern is not absolutely essential but is also not ruled out.

Those metallocene catalysts in which both cyclopentadienyl ligands are linked to one another by means of a bridge member are also of interest. Such bridge members generally have 1 to 4 atoms (carbon atoms and/or heteroatoms, such as Si, N, P, O, S, Se or B) and may have alkyl side chains, e.g. 1,2-ethylidene, 1,3-propylidene or dialkylsilane bridges.

Examples of readily exchangeable, formally negatively charged leaving atoms or leaving groups $X^1$, $X^2$ of the metallocene complexes of the formula $Cp_2MX^1X^2$ are hydrogen and halogen, such as fluorine, bromine, iodine and preferably chlorine. Other examples are alcoholates, such as methanolate, ethanolate, n-propanolate, isopropanolate, phenolate, trifluoro-methylphenolate, naphtholate and silanolate.

Other preferred groups $X^1$, $X^2$ are in particular $C_1$- to $C_{10}$-alkyl radicals, especially methyl, ethyl, propyl, isopropyl, butyl, isobutyl, sec-butyl, tert-butyl, pentyl, neopentyl and hexyl, preferably methyl, tert-butyl and neopentyl, and furthermore alicyclic $C_3$ to $C_{12}$-hydrocarbon radicals, such as cyclopropyl, cyclobutyl, cyclopentyl and in particular cyclohexyl, or $C_5$- to $C_{20}$-bicycloalkyl, such as bicyclopentyl and in particular bicycloheptyl and bicyclooctyl.

Examples of substituents $X^1$, $X^2$ having aromatic structural units are $C_6$- to $C_{15}$-aryl, preferably phenyl or naphthyl, alkylaryl or arylalkyl, each having 1 to 10 carbon atoms in the alkyl radical and 6 to 20 carbon atoms in the aryl radical, for example tolyl and benzyl.

Individual examples of suitable metallocene complexes are: bis(n-octadecylcyclopentadienyl)zirconium dichloride, bis(trimethylsilylcyclopentadienyl)zirconium dichloride, bis(tetrahydroindenyl)zirconium dichloride, bis[(tert-butyldimethylsilyl)cyclopentadienyl]zirconium, dichloride, bis(di-tert-butylcyclopentadienyl)zirconium, dichloride, (ethylidenebisindenyl)zirconium dichloride, [ethylidenebis(tetrahydroindenyl)]zirconium dichloride and bis [3,3-(2-methylbenzindenyl)]dimethylsilanediylzirconium dichloride.

Said metallocene complexes can be synthesized in a simple manner by known processes, e.g. Brauer (editor): Handbuch der Präparativen Anorganischen Chemie, Volume 2, $3^{rd}$ edition, pages 1395 to 1397, Enke, Stuttgart 1978. A preferred process starts from the lithium salts of the correspondingly substituted cyclopentadienyls, which are reacted with the transition metal halides.

Expediently, only one metallocene complex is used in the oligomerization reaction, but it is also possible to use mixtures of different metallocene complexes.

In addition to the metallocene complexes, the catalyst systems also contain activators which are known per se and are also referred to as cocatalysts in the literature. In general, they alkylate the transition metal component of the catalyst system and/or abstract a ligand X from the transition metal component, so that finally a catalyst system for the oligomerization of olefinically unsaturated hydrocarbons can form. In general, organometallic compounds of the $1^{st}$ to $3^{rd}$ main groups or the $2^{nd}$ subgroup of the Periodic Table are suitable for achieving this object, but other acceptor compounds, for example carbocationic salts, can also be used.

Activator compounds suitable in the present case are, in addition to aluminum fluoride, in particular organoaluminum and organoboron compounds and carbocationic salts. Open-chain or cyclic oligomeric aluminoxane compounds which can be obtained by reacting trialkylaluminums, in particular trimethyl- or triethylaluminum, with water are preferred.

Suitable cocatalysts are in general also aluminum organyls of the formula $Al(R^2)_3$, where $R^2$ is hydrogen or $C_1$- to $C_{10}$-alkyl, preferably $C_1$- to $C_4$-alkyl, in particular methyl, ethyl or butyl. $R^2$ may furthermore be arylalkyl or alkylaryl, each having 1 to 10 carbon atoms in the alkyl radical and 6 to 20 carbon atoms in the aryl radical.

Other suitable alkylaluminums $Al(R^2)_3$ are those in which $R^2$, in addition to the abovementioned radicals, may also be fluorine, chlorine, bromine or iodine, with the proviso that at least one radical $R^2$ is an organic carbon radical or a hydrogen atom. Particularly preferred compounds are trimethylaluminum, triethylaluminum, triisobutylaluminum, diisobutylaluminum hydride and diethylaluminum chloride.

Other suitable activators are organoboron compounds, for example trisarylboron compounds, preferably tris(pentafluorophenyl)boron, and furthermore salts of carbonium ions, preferably triphenylmethyl tetraarylborate, in particular triphenylmethyl tetra(pentafluorophenyl)borate.

Said Al, B or C compounds are known or are obtainable in a manner known per se.

The activators can be used alone or as mixtures in the catalyst system.

The activator component is preferably used in a molar excess relative to the metallocene complex. The molar ratio of activator to metallocene complex is in general from 100:1 to 10,000:1, preferably from 100:1 to 1000:1.

The components of the catalyst systems described can be introduced into the oligomerization reactor individually in any desired sequence or as a mixture. The metallocene complex is preferably mixed with at least one activator component before entering the reactor, i.e. is preactivated.

The preparation of the oligoalkenes can be carried out either batchwise or preferably continuously in the conventional reactors used for the oligomerization of olefins. Suitable reactors include continuously operated stirred kettles, it also being possible, if required, to use a plurality of stirred kettles connected in series.

The oligomerization can be carried out in a suspension, in liquid monomers and in inert solvents. In the oligomerization in solvents, in particular liquid organic hydrocarbons, such as benzene, ethylbenzene or toluene, are used. The oligomerizations are preferably carried out in a reaction mixture in which the liquid monomer is pre sent in excess.

Since the oligomerization is carried out as a rule at from −20° C. to 200° C., in particular from 0 to 140° C., especially from 30° C. to 110° C., it can generally be effected by the low-pressure or medium-pressure process. The amount of catalyst used is not critical.

The oligoalkenes prepared by metallocene catalysis contain unsaturated double bonds, owing to the oligomerization mechanism; here, the proportion of terminal vinylidene double bond is particularly high, and it is this that permits the substantially complete thermal reaction with maleic anhydride.

The oligoalkenes described have a number average molecular weight ($\overline{M}_n$) of from 700 to 20,000, preferably from 1000 to 18,000, especially from 2000 to 15,000, in particular from 3000 to 12,000. The number average molecular weight is usually determined by gel permeation chromatography (GPC).

The molecular weight distribution $\overline{M}_w/\overline{M}_n$ (weight average value/number average value) is in general from 1.5 to 5, it being possible for a narrow distribution to be achieved for example by extraction of samples having a broad distribution, and for a broad distribution to be obtained also by mixing. If uniform catalyst systems are used, the distribution is in general from 1.8 to 3.0. In certain circumstances, a broader distribution may be more advantageous; in particular, a broad low molecular weight flank in the distribution can improve the dispersing effect of the end products. Furthermore, bimodal distributions produced by mixing may also have an advantageous effect.

The oligoalkenes described are reacted with maleic anhydride (MAA) by conventional thermal ene reaction to give alkenyl-succinic anhydrides, which as a rule carry 1 or 2 succinic anhydride units per alkenyl chain. For this purpose, the maleic anhydride and the oligoalkenes are expediently heated to temperatures of from 150 to 250° C., preferably from 170 to 220° C., in the absence of compounds initiating free radical chain reactions. The reaction is advantageously carried out under inert gas (e.g. nitrogen).

The novel thermal reaction products of maleic anhydride and oligoalkenes can be converted by means of amines or alcohols, by conventional methods, into the corresponding alkenylsuccinamides, alkenylsuccinimides or alkenylsuccinic esters; the present invention likewise relates to such derivatives.

In particular polyols, especially aliphatic polyhydroxy compounds having 2 to 6 hydroxyl groups, may be used here as alcohols. Examples of diols are ethylene glycol, 1,2- and 1,3-dihydroxy-propane, dihydroxybutanes and dihydroxy-pentanes. Examples of triols are glycerol, trihydroxybutanes, trihydroxy- pentanes and trimethyolpropane. Examples of higher alcohols are pentaerythritol, mannitol and sorbitol.

In order to form corresponding succinimide or succinamide derivatives, reaction with an amine which has at least one secondary amine function (NH) or one primary amine function ($NH_2$), is necessary. Of particular interest here are linear or branched alkylenepolyamines, cycloaliphatic polyamines and heterocyclic polyamines, each having 2 to 6 amino groups. Examples of these are ethylenepolyamines, such as ethylenediamine, diethylene-triamine, triethylenetetramine, tetraethylenepentamine or pentaethylenehexamine, propylenepolyamines, dimethylamino-propylamine, α,β-diaminopropanes, α,β-diaminobutanes, di(trimethylene)triamine, butylenepolyamines, piperazine or diaminocyclohexanes.

Of particular interest as derivatives of the novel thermal reaction products of maleic anhydride and oligoalkenes are the corresponding alkylsuccinimides which are derived from polyamines having at least one primary amine function.

A preferred embodiment comprises those derivatives of the thermal reaction products of maleic anhydride and oligoalkenes with amines in the form of the corresponding alkenylsuccinimides which are obtainable by condensation of the reaction products of maleic anhydride and oligoalkenes with polyamines, the amount of polyamines used being from 10 to 200% above the theoretical amine requirement for the preparation of a bissuccinimide and the amine number of the condensate thus obtained being at least 70% of the theoretical amine number of the bissuccinimide, based on the saponification number of the reaction product of maleic anhydride and oligoalkenes.

The maleation of the oligoalkenes (typical conditions: 4 h, 200° C., 10% by weight, based on the oligoalkene, of MAA) is evidently accompanied by other reactions which give products which, after MAA has been distilled off and the alkenylsuccinic anhydride filtered, do not give any acid number or saponification number (SN) but react with the amino groups in the subsequent imidation stage (typical conditions: 3 h, 180° C.) with polyamines, with loss of the basicity (amine number).

The theoretical amine number is calculated from the saponification number of the alkenylsuccinic anhydride (SA), assuming an imidation reaction with two moles of anhydride and one mole of polyamine (e.g. tetraethylenepentamine (TEPA)). When using the theoretical amount of amine, however, the theoretical amine number is not obtained and a poor dispersing effect results. The dispersing effect is all the poorer the further away the amine number is from the theoretical value. The amount of amine is then increased until at least the theoretical amine number is reached during the condensation. At this point an excellent dispersing effect is then obtained.

However, a substantially higher amine number should then result for a bissuccinimide with the amount of amine then used. By iteration, an amount of amine which corresponds to only three of the originally five amine functions after condensation in the case of TEPA is finally obtained. The optimum effect generally occurs between these two key points.

Two examples in Table 1 below are intended to illustrate this unexpected discrepancy between alkenylsuccinic anhydride and amine requirement:

TABLE 1

| Oligodecenylsuccinic anhydride | | Calc. amine number for bissuccinimide with 0.5 mol of TEPA | Actual TEPA demand [mol]/ [mol of SA] | TEPA excess [%] |
| --- | --- | --- | --- | --- |
| SN | theoretical $M_n$ | | | |
| 11.25 | 9,973 | 8.37 | 0.85 | 70 |
| 8.0 | 14,025 | 5.96 | 1.10 | 120 |

The novel derivatives of the thermal reaction products of maleic anhydride and oligoalkenes with amines or alcohols are very useful as fuel additives and in particular as lubricant additives, especially as ashless dispersants in motor oils. The novel derivatives produce excellent viscosity/temperature behavior in motor oils to which they have been added, so that it is possible substantially or at least partly to dispense with the conventional viscosity index improvers. In particular, a substantial reduction in the low-temperature viscosity is achieved. Moreover, they have an excellent dispersing effect even in small amounts.

The present invention also relates to motor oils containing from 0.1 to 10, in particular from 0.5 to 7, % by weight, based on the motor oil, of the novel derivatives of the thermal reaction products of maleic anhydride and oligoalkenes with amines or alcohols. Motor oils are to be understood here as meaning both mineral and partly and wholly synthetic motor oils (based on, for example, mineral oil, synthetic components, such as organic esters, synthetic hydrocarbons, poly-α-olefins or polyolefins, such as polyisobutene, or mixtures of mineral oil with such synthetic components). Such motor oils can be used for a very wide range of intended applications (for example, four-cycle motor oils, two-cycle motor oils, automobile and motorcycle motor oils, marine diesel engine oils, locomotive diesel engine oils, etc.). The novel derivatives of the thermal reaction products are also suitable as additives in gear oils.

In the examples which follow and illustrate the invention without restricting it, percentages are by weight, unless stated otherwise.

PREPARATION EXAMPLES

Example 1
Synthesis of an oligodecene with $\overline{M}_n$=11,400

In a 1 l stirred autoclave having a V4A stainless steel double jacket, 400 ml of linear 1-decene (polymer quality, 99.8%) were initially taken together with 300 ml of ethylbenzene dried over $Al_2O_3$ and were heated to 50° C. 44 mg of (ethylidenebis-indenyl)zirconium dichloride were dissolved in 43.8 ml of methylaluminoxane (10% strength in n-hexane) in a Schlenk vessel, forced into the reactor through a lock a little at a time by means of nitrogen and washed through with 30 ml of ethylbenzene. The portions were such that the cryostat which removed the heat of reaction was not overloaded and could keep the reaction temperature at 50° C. The maximum difference in temperature between jacket and reactor content was 40° C. which disappeared in the course of from 2 to 3 hours. After 4 hours, the mixture was cooled to room temperature, and the autoclave was emptied and dilution was effected with aliquot amounts of cyclohexane. Washing was carried out with 100 ml of 0.1% strength sulfuric acid and with twice 100 ml of demineralized water, drying was carried out over $Na_2SO_4$ and distillation was effected up to 225° C. (2 mbar). The bottom product had a viscosity of 1100 $mm^2$/s (100° C.) and an $\overline{M}_n$ of 11,400 according to GPC. The yield was 85% and the vinylidene double bond content was 94%.

Example 2
Reaction of the oligodecene from Example 1 with maleic anhydride (MAA) and derivatization with tetraethylenepentamine (TEPA)

200 g of the oligodecene from Example 1 were initially taken with 20 g of MAA in a 0.5 l V2A stainless steel stirred autoclave, evacuated to 20 mbar, brought to atmospheric pressure with nitrogen and evacuated again to 20 mbar. The mixture was then heated to 200° C. and kept at this temperature for four hours, after which the autoclave was let down and the mixture was freed from excess MAA at 2 mbar. The reaction product had a saponification number of 6.0. After the temperature had been reduced to 180° C., 1.53 g of TEPA were added and condensation was carried out for a further 2 hours. The acid number of the imide was 0.7 and the amine number was 4.8.

Example 3
Synthesis of an oligodecene with $\overline{M}_n$=5600

400 ml of linear 1-decene (purity: 96%) and 300 ml of ethyl-benzene dried over $Al_2O_3$ were initially taken in a 1 l stirred autoclave having a double jacket according to Example 1 and were cooled to zero ° C. 80 mg of bis(n-octadecylcyclopentadienyl)-zirconium dichloride were activated with 32 ml of methylaluminoxane (10% strength in n-hexane) in a Schlenk vessel and were added in two portions in the course of 5 minutes. A temporary temperature increase from 2 to 3° C. was observed. After 8 hours at 0° C., the reactor was emptied, the reaction was stopped by slow dropwise addition of dilute sulfuric acid while stirring, and working up was effected as in Example 1. An oligodecene having a viscosity of 580 $mm^2$/s at 100° C. and an $\overline{M}_n$ of 5600 according to GPC was obtained. The yield was 83% and the vinylidene double bond content was 95%.

COMPARATIVE EXAMPLE A:
Derivative of polyisobutenylsuccinic anhydride (PIBSA) with TEPA For comparison, 200 g of highly reactive polyisobutene having a number average molecular weight ($\overline{M}_N$) of 2330 and a vinylidene double bond content of 77% were initially taken in a V2A stainless steel stirred autoclave, heated to 160° C., evacuated, and stripped with nitrogen. 13 g of MAA in liquid form were metered in while stirring in the course of 1 hour. The temperature was then increased to 225° C. and the reaction was allowed to continue for 4 hours. Excess MAA was removed under a reduced pressure of 2 mbar. The reaction product had a saponification number of 42. After the temperature had been reduced to 180° C., TEPA was added in a ratio to PIBSA of 1:2, i.e. 7.9 g, and condensation was carried out for a further 2 hours.

Testing the viscosity/temperature behavior

The products from Example 2 and Comparative Example A were tested as ashless dispersants in a concentration of 6% in a 5w/30 motor oil having the following composition:

| | |
|---|---|
| conventional poly-α-olefin (viscosity: 6 $mm^2$/s) | 54.4 or 48.4% |
| conventional poly-α-olefin (viscosity: 4 $mm^2$/s) | 20% |
| diisononyl adipate | 20% |
| ashless dispersant | 0 or 6% |
| conventional superbasic sulfonate | 3% |
| zinc dithiophosphate | 1.8% |
| conventional antioxidant | 0.5% |
| conventional friction modifier | 0.2% |
| conventional antifoam | 0.1% |

The results are summarized in Table 2:

TABLE 2

| Dispersant according to example | Viscosity at 100° C. [$mm^2$/s] | Viscosity at −25° C. [mPa s] | Solubility |
|---|---|---|---|
| no dispersant | 7.55 | 1900 | clear |
| 2 | 12.15 | 3000 | clear |
| A | 10.85 | 3400 | clear |

The novel dispersant from Example 2 is accordingly substantially superior to the prior art (Comparative Example A) owing to the greater viscosity-increasing effect at high temperature in combination with lower viscosity at low temperature.

Testing of the dispersing effect

For testing the dispersing effect, the spot test was carried out (described in "Les Huiles pour Moteurs et la Graissage des Moteurs", A. Schilling, Vol. 1, page 89 et seq., 1962). For this purpose, 3% strength mixtures of the dispersants in a particulate diesel oil were prepared. The dispersions thus obtained were developed on a filter paper in the same way as a chromatogram. The rating scale extended from 0 to 1000: the higher the value obtained the better the dispersing effect.

The results are summarized in Table 3.

TABLE 3

| Dispersant according to example | 10 min at 20° C. without water | 10 min at 20° C. with water | 10 min at 250° C. without water | 10 min at 250° C. with water |
|---|---|---|---|---|
| 2 (with 3% of dispersant) | 675 | 677 | 704 | 701 |
| 2 (with 2% of dispersant) | 654 | 638 | 654 | 638 |
| A (with 3% of dispersant) | 651 | 647 | 643 | 661 |

The novel dispersant from Example 2 had a significantly better dispersing effect than the prior art in all cases, since 2% of the product from Example 2 are sufficient to achieve a dispersing effect comparable with that achieved with 3% of Comparative Example A.

We claim:

1. A thermal reaction product of maleic anhydride and oligoalkenes which are obtainable by metallocene-catalyzed oligomerization of linear 1-decene, it being possible for up to 40%, based on the amount of linear 1-decene, of further linear $C_8$-$C_{12}$-1-alkenes to be incorporated as polymerized units in the presence of a titanium, zirconium or hafnium metallocene catalyst and of an activator based on organoaluminum, organoboron or carbocationic compounds, have a vinylidene double bond content of more than 30% and have a number average molecular weight of from 700 to 20,000.

2. A thermal reaction product as claimed in claim 1 of oligoalkenes which are obtainable by oligomerization of 1-alkenes which are used virtually free of more highly volatile hydrocarbons of less than 8 carbon atoms.

3. A thermal reaction product as claimed in claim 1 of oligoalkenes having a number average molecular weight of from 2000 to 15,000.

4. A derivative of a thermal reaction product of maleic anhydride and oligoalkenes as claimed in claim 1 with amines or alcohols in the form of the corresponding alkenylsuccinamides, alkenylsuccinimides or alkenylsuccinic esters.

5. A derivative of a thermal reaction product of a maleic anhydride and oligoalkenes with amines in the form of the corresponding alkenylsuccinimides as claimed in claim 4, obtainable by condensation of a reaction product of maleic anhydride and oligoalkenes with polyamines, the amount of polyamines used being from 10 to 200% above the theoretical amine requirement for the preparation of a bissuccinimide and the amine number of the condensate thus obtained being at least 70%, based on the saponification number of the reaction product of maleic anhydride and oligoalkenes, of the theoretical amine number of the bissuccinimide.

6. A motor oil containing from 0.1 to 10% by weight, based on the motor oil, of derivatives of the thermal reaction products of maleic anhydride and oligoalkenes with amines or alcohol as claimed in claim 4.

7. A process for preparing thermal reaction products by heating maleic anhydride with oligoalkenes obtained by oligomerization of linear $C_8$- to $C_{12}$-1-alkenes, have a vinylidene double bond content of more than 30% and have a number average molecular weight of from 700 to 20,000, in the absence of compounds initiating free radical chain reactions, at temperatures of from 150 to 250° C., wherein the oligoalkenes have been obtained by metallocene-catalyzed oligomerization in the presence of a titanium, zirconium or hafnium metallocene catalyst and of an activator based on organoaluminum, organoboron or carbocationic compounds.

8. A process for preparing derivatives of the thermal reaction products of maleic anhydride and oligoalkenes, as set forth in claim 7, which comprises reacting the thermal reaction products with amines or alcohols to give the corresponding alkenylsuccinamides, alkenylsuccinimides or alkenylsuccinic esters.

* * * * *